(12) United States Patent
Huang et al.

(10) Patent No.: US 11,381,734 B2
(45) Date of Patent: Jul. 5, 2022

(54) ELECTRONIC DEVICE AND METHOD FOR CAPTURING AN IMAGE AND DISPLAYING THE IMAGE IN A DIFFERENT SHAPE

(71) Applicant: Lenovo (Beijing) Co., Ltd., Beijing (CN)

(72) Inventors: Ling Huang, Beijing (CN); Baotong Fang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/238,293

(22) Filed: Jan. 2, 2019

(65) Prior Publication Data

US 2019/0208110 A1 Jul. 4, 2019

(30) Foreign Application Priority Data

Jan. 2, 2018 (CN) .......................... 201810003715.0

(51) Int. Cl.
*H04N 5/232* (2006.01)

(52) U.S. Cl.
CPC ..... *H04N 5/23216* (2013.01); *H04N 5/23293* (2013.01)

(58) Field of Classification Search
CPC ................................................ H04N 5/23216
See application file for complete search history.

(56) References Cited

U.S. PATENT DOCUMENTS

| | | | | |
|---|---|---|---|---|
| 9,100,588 | B1* | 8/2015 | Seymour | H04N 5/2621 |
| 2005/0286888 | A1* | 12/2005 | Konttinen | G03B 17/20 |
| | | | | 396/374 |
| 2007/0076269 | A1* | 4/2007 | Kido | H04N 9/0451 |
| | | | | 358/474 |
| 2010/0013950 | A1* | 1/2010 | Kikuchi | H04N 5/772 |
| | | | | 348/222.1 |
| 2013/0258044 | A1* | 10/2013 | Betts-Lacroix | H04N 5/2258 |
| | | | | 348/36 |
| 2013/0266209 | A1 | 10/2013 | Matsuda | |
| 2015/0281583 | A1* | 10/2015 | Chukka | G06F 3/0346 |
| | | | | 348/333.12 |
| 2015/0341536 | A1* | 11/2015 | Huang | H04N 5/23206 |
| | | | | 348/208.2 |

FOREIGN PATENT DOCUMENTS

| | | |
|---|---|---|
| CN | 103795892 A | 5/2014 |
| CN | 104469119 A | 3/2015 |
| CN | 106973228 A | 7/2017 |

* cited by examiner

*Primary Examiner* — Gary C Vieaux
(74) *Attorney, Agent, or Firm* — Anova Law Group, PLLC

(57) ABSTRACT

The present disclosure discloses an electronic device having a collecting device and a display device. The collecting device includes a light sensing surface having a first shape to convert external light into an original image. The display device having a display area displaying a portion of the original image in a second shape. The first and second shapes are different shapes.

16 Claims, 7 Drawing Sheets

Before Storing Image:
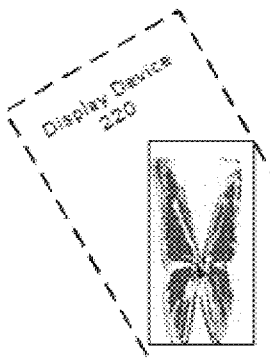
After Storing Image:
FIG. 6A
FIG. 6C
Before Storing Image:
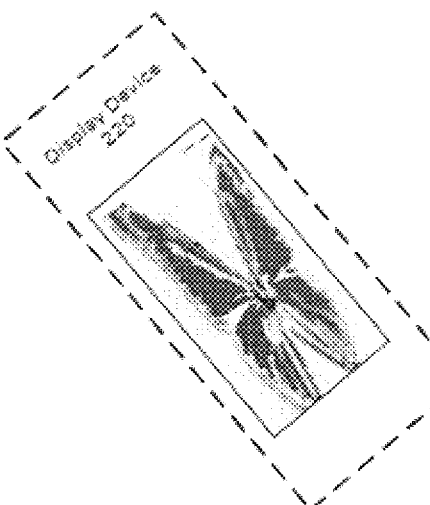
FIG. 6B

ELECTRONIC DEVICE AND METHOD FOR CAPTURING AN IMAGE AND DISPLAYING THE IMAGE IN A DIFFERENT SHAPE

CROSS-REFERENCES TO RELATED APPLICATIONS

This application claims the priority to Chinese Patent Application No. 201810003715.0, entitled "An Electronic Device and the Method for Capturing an Image," filed on Jan. 2, 2018, the entire content of which is incorporated herein by reference.

FIELD OF THE DISCLOSURE

The present disclosure relates to an electronic device and a method for capturing an image.

BACKGROUND

When capturing an image using an electronic device, a collecting device including an optical module such as a lens, and a light sensing module such as a photosensor is required to capture the original image. A collected image is displayed through a display area of the display device, for example, in a 4:3 or 16:9 display frame. Under the current technology, the shape of the original image captured by the collecting device is often the same or similar to the shape of the image displayed by the display device. For example, if the shape of the original image captured by the collecting device is a rectangle, the image displayed by the display device is also scaled to a rectangle.

BRIEF SUMMARY OF THE DISCLOSURE

One aspect of the present disclosure provides an electronic device. The collecting device includes a light sensing surface having a first shape to convert external light into an original image. The display device having a display area displaying a portion of the original image in a second shape. The first and second shapes are different shapes.

In some embodiments, the first shape includes a first area, wherein the first area is an area formed by moving an area corresponding to the second shape in a plane.

In some embodiments, the second shape is a first rectangle, and the first area is formed by translation or rotation of a second rectangle that corresponds with the first rectangle; or the second shape is a first rectangle, and the first shape is a first circle that circumscribes a second rectangle that corresponds to the first rectangle.

In some embodiments, the device further includes a storage device to store images, wherein, before storing the original image, the display device displays a portion of the real-time image; a first input device to generate a first input data; and a processing device to trigger the storage device to store the original image in response to the first input data, wherein the original image corresponds to a real-time image collected to generate the first input data.

In some embodiments, the device further includes a second input device to generate a second input data. The processing device triggers the display device to display an updated partial image corresponding to the second input data.

In some embodiments, the second input device is a user input device or an input device that detects a change in spatial parameters.

In some embodiments, the second input device detects spatial parameters of the display device, and inputs a change in the spatial parameters. In response to satisfying a first condition of the spatial parameters of the display device: the direction of the real-time image displayed by the display device has a first relationship with respect to the direction of the display area; the direction of the real-time image displayed by the display device has a second relationship with respect to the direction of physical objects in their surroundings in the real-time image. The first and second relationships are different. In response to not satisfying the first condition of the spatial parameters of the display device, the direction of the real-time image displayed by the display device is consistent with the direction of the physical objects in their surroundings.

Another aspect of the present disclosure provides an electronic device. The electronic device includes a collecting device. The collecting device includes an optical device that receives external light; a light sensing device that has a light sensing surface having a first shape to convert the external light into electrical signals to generate an original image; a display device that has a display area having a second shape to display a portion of the original image. The first and second shapes are different.

In some embodiments, the first shape is a shape including a first area, wherein the first area corresponds to the second shape.

In some embodiments, the second shape is a first rectangle, and the first area is formed by translation or rotation of a second rectangle that corresponds to the first rectangle; or the second shape is a first rectangle, and the first shape is a first circle that circumscribes a second rectangle that corresponds to the first rectangle.

In some embodiments, the device further includes a storage device to store images, wherein, before storing the original image, the display device displays a portion of a real-time image; a first input device to generate a first input data; and a processing device to trigger the storage device to store the original image in response to the first input data, wherein the original image is a real-time image corresponding to the first input data.

In some embodiments, the device further includes a second input device to generate a second input data. The processing device triggers the display device to display an updated partial image in response to the second input data.

In some embodiments, the second input device is a user input device or an input device that detects a change in spatial parameters.

In some embodiments, the second input device detects the spatial parameters of the display device, and inputs a change in spatial parameters. In response to satisfying a first condition of the spatial parameters of the display device: the direction of the real-time image displayed by the display device has a first relationship with respect to the direction of the display area; and the direction of the real-time image displayed by the display device has a second relationship with respect to the direction of physical objects in their surroundings in the real-time image. The first and second relationships are different. In response to not satisfying the first condition of the spatial parameters of the display device, the direction of the real-time image displayed by the display device is consistent with the direction of the physical objects in their surroundings.

Another aspect of the present disclosure provides a method for capturing an image using an electronic device. The method includes capturing an original image, the original image having a first shape; and displaying a portion of the original image, the portion of the original image having a second shape. The first and second shapes are of different types.

In some embodiments, the method further includes receiving first input data; and in response to the first input data, capturing the original image.

In some embodiments, the method further includes receiving second input data; and in response to the second input data, display a portion of an updated original image.

In some embodiments, the method further includes detecting the spatial parameters of the display device; in response to satisfying a first condition of the spatial parameters of the display device, displaying a portion of the real-time image in a direction having a first relationship with respect to the direction of the display area; or displaying the direction of the real-time image in a direction having a second relationship with respect to the direction of objects in the real-time image, the first and second relationships being different.

In some embodiments, the method further includes in response to not satisfying the first condition of the spatial parameters of the display device, displaying a portion of the real-time image in a direction that coincides with the direction of objects in the real-time image.

BRIEF DESCRIPTION OF THE DRAWINGS

For a more complete understanding of the present disclosure, and the advantages thereof, reference is now made to the following descriptions to be taken in conjunction with the accompanying drawings.

FIG. 6A-FIG. 6C are schematic diagrams illustrating a display device displaying an image before and after storing the according to an embodiment of the present disclosure;

DETAILED DESCRIPTION

Figure 1:
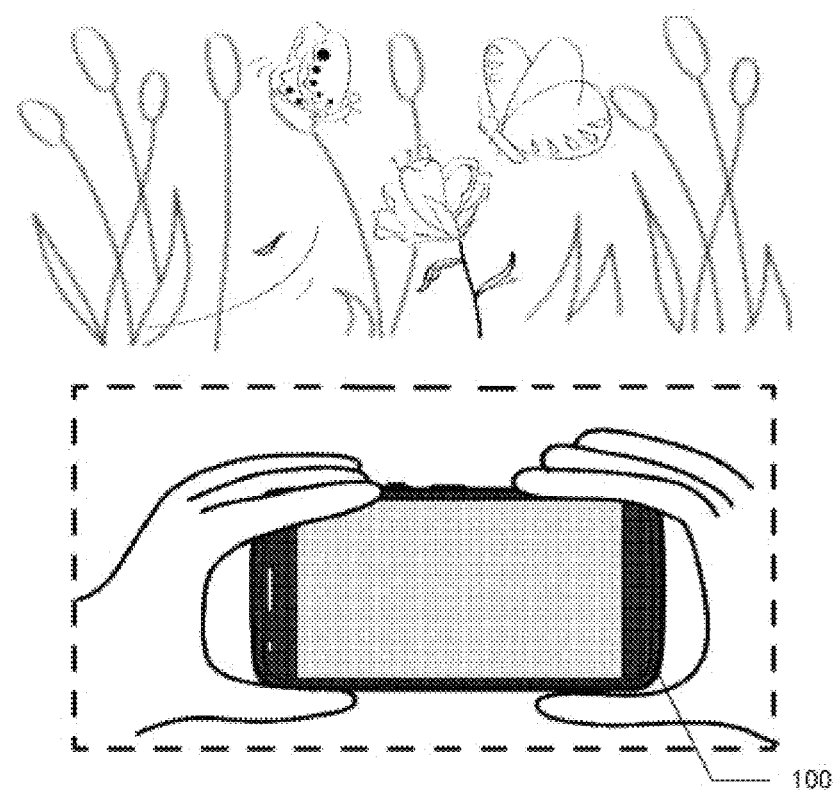
FIG. 1 is a schematic diagram illustrating an electronic device and a scenario of applying the method for capturing an image according to an embodiment of the present disclosure.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present specification and should not be interpreted in an idealized or overly stereotyped manner.

Some block diagrams and/or flowcharts are shown in the accompanying drawings. It should be understood that some blocks or combinations thereof in the block diagrams and/or flowcharts may be implemented by computer program instructions. The computer program instructions may be provided to a general purpose computer, a dedicated computer, or processors of other programmable data processing devices, so that the instructions, when being executed by the processor, may create means for implementing the functions/operations as described in the block diagrams and/or flowcharts.

Thus, the techniques of the present disclosure may be implemented in forms of hardware and/or software (including firmware, microcode, etc.). In addition, the techniques of the present disclosure may be embodied in a form of a computer program product on a computer readable medium storing instruction. The computer program product may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

One aspect of the present disclosure provides an electronic device and a method for capturing an image using the electronic device. The electronic device includes a collecting device and a display device. The collecting device includes an optical module and a light sensing module. The optical module is used for transmitting external light, and the light sensing module has a light sensing surface of a first shape for converting the external light into electrical signals. The electric signal may be used to generate an original image corresponding to the external light. The display device has a second shaped display area that may be used to display a portion of the original image. Further, the first and second shapes may be of different types.

More specifically, the difference between the first shape and the second shape is that the second shape is not a shape obtained by scaling the first shape in equal proportions (including the case where the ratio is 1), and vice versa.

In some embodiments, the difference between the first shape and the second shape may include shapes having different ratios in at least two dimensional parameters. For example, the first shape may be a rectangle having an aspect ratio of 8:3, and the second shape may be a rectangle having an aspect ratio of 4:3. That is, the light sensing surface of the light sensing device may generate an original image with a rectangular interface having an aspect ratio of 8:3, and the display device may display a portion of the original image in a rectangular interface with an aspect ratio of 4:3. For another example, the first shape and the second shape may be both elliptical, but the aspect ratios of the first elliptical may be different from the aspect ratio of the second elliptical.

In some embodiments, the difference between the first shape and the second shape may include where the first shape and the second shape are of different shapes. For example, the first shape may be a circle and the second shape may be a rectangle. Or, for example, the first shape may be a rectangle and the second shape may be heterotypic.

According to an embodiment of the present disclosure, the shape of the light sensing surface of the light sensing module that captures the original image may be different from the shape of the display device, hence, the display device may display a portion of the original image. In this way, the display device may display the captured image to meet a variety of display and editing requirements.

For example, in some embodiments, when a partial image is missing from the displayed image due to improper operation of the electronic device, the original image may be supplemented using the image data by rotating or moving the original image.

Or, in some embodiments, when the angle of the electronic device is tilted when capturing the image (for example, when a person takes a picture with a mobile phone, the angle of the mobile phone may be tilted), the angle of the displayed image may be tilted, and the image may be corrected by rotating the original image by an angle. During the image correction process, the electronic device according to the embodiments of the present disclosure, may display a portion of the original image that is not originally displayed. Hence, avoiding the problem of displaying the missing image with black border when correcting a tilted image caused by the fact that the displayed image is consistent with the original image, hence the uncaptured image will be displayed with black border after rotating the displayed image.

FIG. 1 is a schematic diagram illustrating an electronic device and a scenario of applying the method for capturing an image according to an embodiment of the present disclosure As shown in FIG. 1, an electronic device 100 and a method for capturing an image according to an embodiment of the present disclosure may be used during photographing or video recording.

The electronic device 100 can capture an original image using a collecting device and display the image through the display area of the display device. According to an embodiment of the present disclosure, the shape and the image of the original image may correspond to the shape of the light sensing surface of the light sensing module in the collecting device, and the shape of the displayed image on the display device may correspond to the shape of the display area. According to an embodiment of the present disclosure, the shape of the display area may be different from the shape of the light sensing surface such that the image displayed by the display area of the display device may be a portion of the original image. In some embodiments, the light sensing module may also be capable of converting more external light transmitted through the optical component into image data, hence increasing the utilization of ambient lights transmitted through the optical module.

In the present disclosure, a module may refer to a hardware component, a software component, or a combination thereof. In one embodiment, a module may include computer executable instructions stored in computer readable media. When executed by one or more processors, the computer executable instructions may implement certain functions correspond to the module. Further, the software component (e.g., computer executable instructions stored in a computer readable medium) may work together with one or more hardware components (e.g., a sensor, or a lens, etc.) to implement the functions of the module.

In some embodiments, when the user finishes photographing and finds that the image displayed in the displayed display area is tilted or needs to pan part of the image to obtain the desired image, the user may rotate or translate the displayed image to select the desired portion of the image from the original image. This way, the user does not need to recapture the image and the user experience is greatly enhanced.

In other embodiments, the user may preview the image through the display area of the display device while capturing an image. Whether the electronic device 100 held by the user may be inclined at a certain angle (for example, horizontally tilts the electronic device in FIG. 1 while holding the electronic device horizontally) or not, the display area of the display device may display the real-time image captured as if the electronic device was not tilted. The specific real-time image can be generated from the corresponding original image captured by the electronic device 100. In some embodiments, the real-time image may be displayed as a horizontal image regardless of the spatial parameters of the electronic device 100. In other embodiments, the real-time image may be displayed matching the spatial physical state of the electronic device.

It can be understood that the electronic device 100 shown in FIG. 1 as a mobile phone is only an example. In practice, the electronic device 100 may be any type of electronic device, such as a PC, a wearable electronic device, a smart home, a camera, a video camera, or a medical system.

Figure 2:
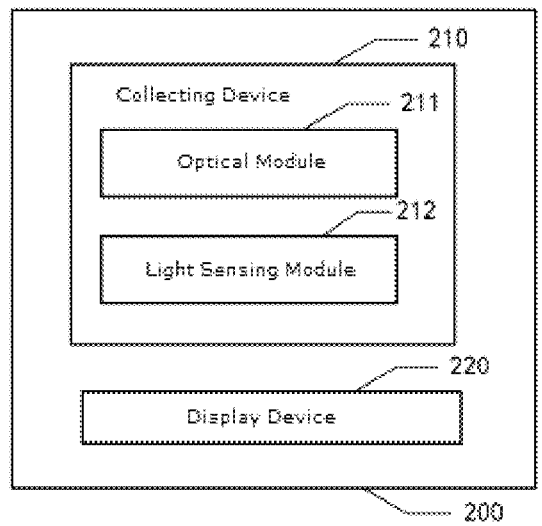
FIG. 2 is a block diagram illustrating an electronic device according to an embodiment of the present disclosure.

FIG. 2 is a block diagram illustrating an electronic device 200 according to an embodiment of the present disclosure.

According to an embodiment of the present disclosure, the electronic device 200 may be an embodiment of the electronic device 100.

As shown in FIG. 2, the electronic device 200 may include a collecting device 210 and a display device 220. Further, the collecting device 210 may include an optical module 211 and a light sensing module 212.

The optical module 211 is used to transmit external light. The light sensing module 212 has a light sensing surface of a first shape for converting the external light into electrical signals to generate an original image corresponding to the external light.

Display device 220 has a second shaped display area to display portions of the original image.

The first shape and the second shape may be of different types. For example, the second shape may be a rectangle, and the first shape may be a circle, an ellipse, or other shapes, such that the image displayed by the second shape is a portion of the original image corresponding to the first shape.

According to an embodiment of the present disclosure, the shape of the light sensing surface of the light sensing module 212 that captures the original image may be different from the shape of the display device, hence, and the display device may display a portion of the original image. In this way, the display device can display the captured image to meet a variety of display and editing requirements.

According to an embodiment of the present disclosure, the first shape may be a shape having a first area formed by moving the first area to match the second shape in a plane.

The first area may be an area formed by moving the area matching the second shape in a plane. For example, reduce the size of the second shape by certain ratio (the ratio may be related to the size of the light sensing surface of the light sensing module 212 and the display device 220), and translate and/or rotate the reduced area in a plane. In this way, when panning or rotating the display area to show different displayed images, the data in the original image may be fully utilized, and the editing ability of the displayed image may be improved.

For example, according to an embodiment of the present disclosure, if a user captures an image with a tilted electronic device, the user may rotate or pan the displayed image within a certain range to obtain desired image. Moreover, in this process, when the amount of translation or the angle of rotation of the image is within a certain range (for example, when the angle of rotation is within plus or minus 15 degrees, generally the angle of tilt of the user's electronic device is often slight), editing the image will not introduce black borders on the image due to lack of sufficient image data. This will greatly enhance the user experience and avoid the problem of displaying the uncaptured image with black borders after rotating the displayed image.

Figure 3:
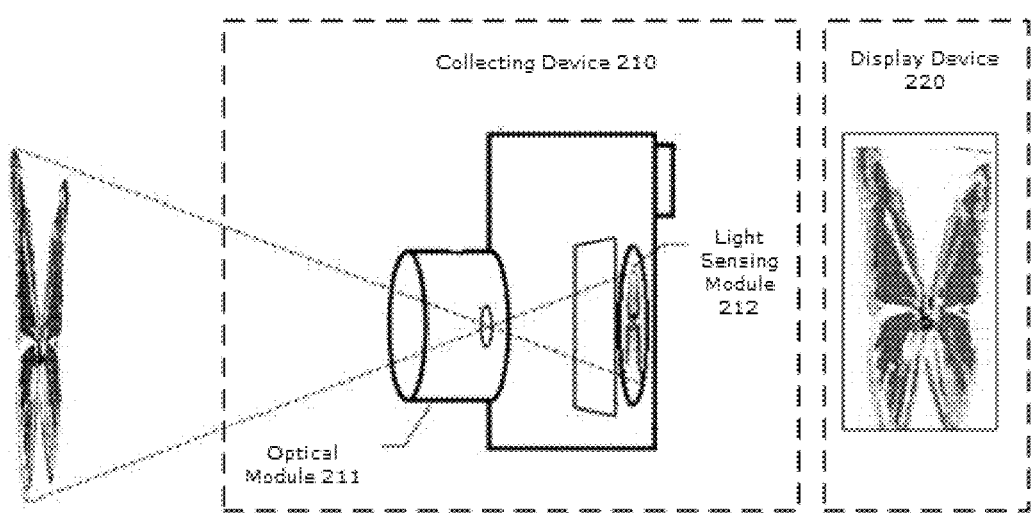
FIG. 3 is a schematic diagram illustrating the structure of an electronic device according to an embodiment of the present disclosure.

FIG. 3 is a schematic diagram illustrating the structure of an electronic device according to an embodiment of the present disclosure.

For convenience of understanding, the shape of the light sensing surface of the light sensing module 212 in FIG. 3 is illustrated as a circular shape, and the display area of the display device 220 is illustrated as a rectangle.

The external light passes through the optical module 211 (e.g., the lens) to the light sensing module 212. The light sensing module 212 includes a circular light sensing surface can convert the external light into electrical signals that may be used to generate an original image corresponding to the external light.

The display area of the display device 220 in FIG. 3 is a rectangle, showing a portion of the original image. As can be seen from the illustration in FIG. 3, the display device 220 displays the overall appearance of the "butterfly" in the original image, but only a portion of the background area (bounded by the border of the circular light sensing surface) where the butterfly is located in the original image is displayed in the rectangular display area.

According to an embodiment of the present disclosure, the shape of the optical module 211 may match the first shape. For example, when the first shape is a circle, the optical module 211 may also be circular. Or, for another example, when the first shape is a rectangle with the aspect ratio of 8:3, the optical module 211 may also be a rectangle proportionally scaled to the first shape.

According to an embodiment of the present disclosure, when the shape of the optical module 211 matches the first shape, all the external light transmitted through the optical module 211 may be distributed in equal proportion to the light sensing surface of the light sensing module 212 so all the external light passing through the optical module 211 can be converted into electrical signals by the light sensing module 212, hence generating an original image that may correspond substantially completely to all the external light transmitted through the optical module 211. In this manner, the utilization of the optical module 211 can be effectively increased, and the image capturing capability of the electronic device 200 is improved.

According to an embodiment of the present disclosure, the second shape may be a first rectangle, and the first area may be formed by translation or rotation of a second rectangle that matches the first rectangle.

More specifically, the second rectangle matching the first rectangle may be a rectangle obtained by scaling the length and width of the first rectangle according to a certain ratio.

The area formed by the translation of the second rectangle may be, for example, the area covered by the translation of the second rectangle starting from a position of its plane in a particular direction (for example, assuming a coordinate system is established in the plane, along the x-axis direction, y-axis direction, or the direction that forms an angle with the x-axis) over a certain distance.

The area formed by the rotation of the second rectangle may be, for example, an area formed by rotating the second rectangle at an angle about any point in the plane in which it may be located. For another example, an area formed by rotating the second rectangle around its center by a certain angle. For another example, an area formed by rotating the second rectangle around one of its vertex by a certain angle. Or, for another example, an area formed by rotating the second rectangle around a point outside of the second rectangle by a certain angle.

The first area may be an area formed by translation or rotation of a second rectangle which may correspond to the first rectangle reduced by certain ratio (the ratio may be related to the size of the light sensing surface of the light sensing module 212 or the size of the display area of the display device 220).

The relationship between the first shape and the second shape is further exemplified below in conjunction with two specific examples shown in FIGS. 4A and 4B.

Figure 4A:
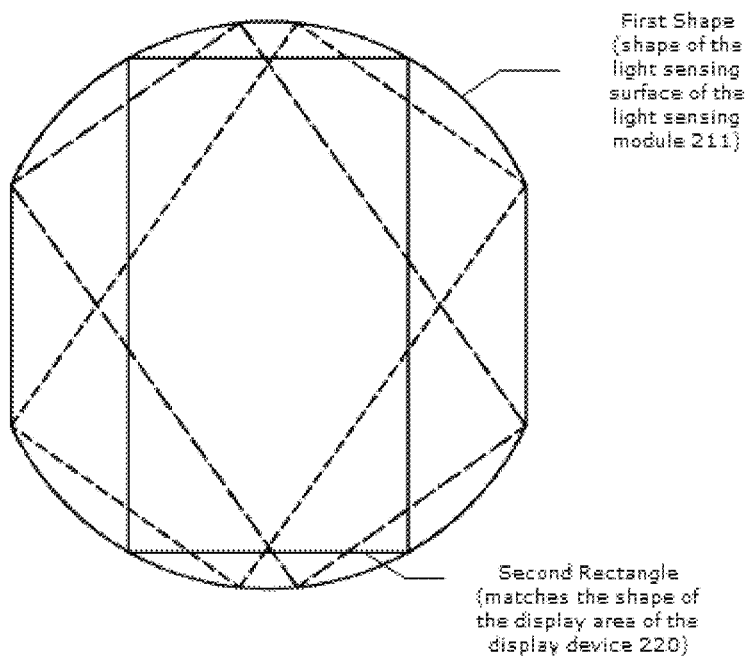
FIG. 4A and FIG. 4B are schematic diagrams illustrating a first shape and a second shape according to an embodiment of the present disclosure.
Figure 4B:
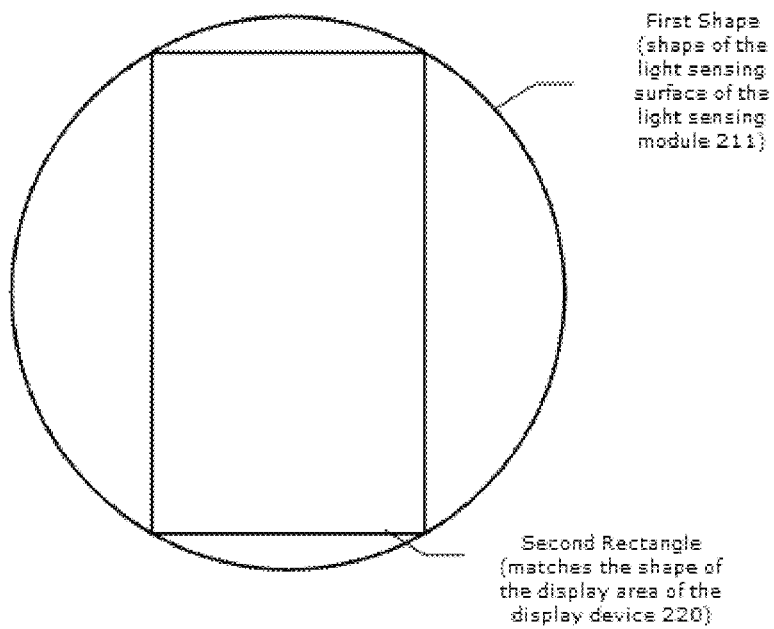

FIG. 4A and FIG. 4B are schematic diagrams illustrating a first shape and a second shape according to an embodiment of the present disclosure.

The second rectangle in FIGS. 4A and 4B is a shape (e.g., after scaling) that corresponds to the shape of the display region of the display device 220, where the shape of the display area of the display device 220 is the first rectangle.

The first shape is the shape of the light sensing surface of the light sensing module 212.

More specifically, for example, as shown in FIG. 4A, the first area may be formed by rotating the second rectangle by a preset angle on both sides of the vertical centerline. In some embodiments, the first shape may exactly match the shape of the first area. In other examples, the first shape may be formed by removing the two facing arches of a circle, where the arc angle of each arch has a preset angle of ≤180°−2*, and the first shape will cover the first area. The preset angle may be statistically determined by the angle that most users tilt their electronic device. This way, when the tilt angle of electronic device 200 is within the preset angle, the user may see the uncaptured area of the original image instead of black borders while editing (for example, rotating the captured image to compensate the tilting of the electronic device 200) the captured image, hence, satisfying the need to correct the tilted image caused by the inclination of the hand when using the electronic device 200.

Of course, in some embodiments, the first shape may also be other shapes formed by translating the second rectangle in a certain direction in the plane.

According to another embodiment of the present disclosure, the second shape may be a first rectangle, and the first shape may be a circle circumscribing a second rectangle that corresponds to the first rectangle, specifically as shown in FIG. 4B.

When the first shape is a circle circumscribing the second rectangle, the displayed image on the display area may be rotated 360° along the center of the second shape to display different portions of the original image.

According to an embodiment of the present disclosure, when reediting an image stored in the electronic device 200 that has already been edited, (for example, rotating the displayed image at any angle) the user may be able to see the undisplayed portions of the original image instead of black borders, hence, satisfying user's need to rotationally correct the displayed image at any angle.

Figure 5:
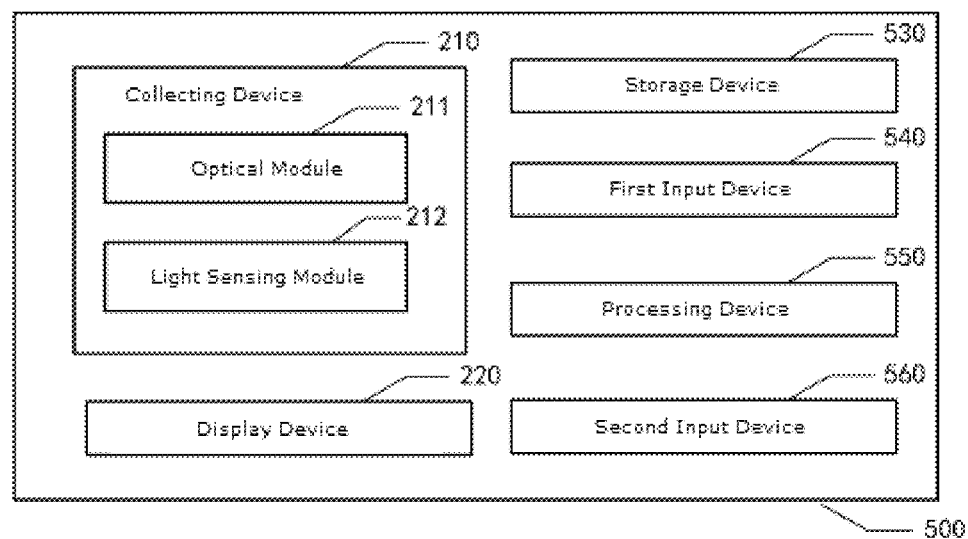
FIG. 5 is a block diagram illustrating an electronic device according to another embodiment of the present disclosure.

FIG. 5 is a block diagram illustrating an electronic device according to another embodiment of the present disclosure.

According to an embodiment of the present disclosure, the electronic device 500 may be one of the embodiments of the electronic device 100.

According to an embodiment of the present disclosure, the electronic device 500 may include a storage device 530, a first input device 540, and a processing device 550 in addition to the collecting device 210 and the display device 220.

The storage device 530 may be used to storing an image. Before the original image is stored, the display device 220 may display a portion of the real-time image corresponding to the external light that change in real time.

More specifically, the display device 220 may display a portion of the real-time image corresponding to the external light that change in real time. For example, the display device 220 may be a continuously updated image preview displayed by the display device 220 during the photographing process.

The first input device 540 may be used to generate a first input data.

The processing device 550 may trigger the storage device to store the original image in response to the first input data, where the original image may be an image corresponding to the external light when the first input data is generated.

More specifically, the first input device 540 may be a touch screen, and the corresponding first input data may be the data generated by touching an area (e.g., an icon triggering the storage of the original image) of the touch screen. Or, the first input device 540 may be a microphone, and the corresponding first input data may be a preset audio signal (e.g., a preset audio signal triggering the storage of the original image) captured by the microphone.

After receiving the first input data, the processing device 550 may trigger the storage device 530 to store the original image corresponding to the preview image when the shutter is actuated.

According to an embodiment of the present disclosure, the electronic device 500 may further include a second input device 560 to generate a second input data. The processing device 550 may trigger the display device to display the updated partial image in response to the second input data. According to an embodiment of the present disclosure, the second input data may be, for example, data for correcting the displayed image (e.g., rotating the displayed image, or moving the displayed image in the display area, etc.).

According to an embodiment of the present disclosure, the second input device 560 may be an input device that may detect a user's operation or an input device that may detect a change in the spatial parameter.

More specifically, in some embodiments, the second input device may detect the user's operation on a device such as a keyboard, a touch screen, or a microphone. Correspondingly, the second input data may be data generated by detecting user's operation on the second input device (e.g., a keyboard, a touch screen, or a microphone).

In other embodiments, the second input device may be an input device that detects changes in spatial parameters, such as a gravity sensor, a gyroscope, or the like. For example, when the second input device is a gravity sensor, the second input data may be the parameters needed to correct the displayed image when the gravity sensor detects the display device 220 of the electronic device is deviated from the initial position (e.g., the initial horizontal or vertical position). For example, when the gravity sensor detected the display device 220 is inclined by 5° in the vertical direction in one direction, it is possible to display an image that is rotated by 5° in the opposite vertical direction.

In some embodiments, the second input data may be generated after the image is stored. In this case, the second input data may be used to edit the stored image.

For example, as described above, when the second input device is used to detect the user's operation, the second input data may be the data generated by detecting the user's operation on the second input device. Therefore, when no user input is detected (for example, when the user is viewing the captured images), and the user's electronic device is tilted (for example, when the electronic device is vertically held at an angle), the captured image displayed on the display device will be tilted correspondingly (i.e., the captured image is stationary with respect to the display area of the display screen). Thereafter, if user input is detected, second input data may be generated, and the displayed image in the display area may be corrected based on the second data. In some embodiments, the second data may be to rotate the electronic device to the vertical direction, so that the displayed image may be rotated (e.g., turning around the center of the display area) relative to the display area of the electronic device. In some embodiments, the second data may be a translation of the displayed image in a direction relative to the display area of the display device by a certain distance and/or a certain angle around a certain position.

Alternatively, if the second input device is an input device that detects a change in the spatial parameters, when the user is viewing the captured images, and the user's electronic device is tilted from its initial position (e.g., vertical position), the input device may detect the tilting of the display area of the electronic device and generate the second input data, and the processing device may trigger the display area of the electronic device to display the updated partial image in response to the second input data, such as rotating the displayed image to compensate the tilt. Therefore, regardless of whether the electronic device may be tilted or not, the direction of the captured image that the user sees may always be vertical.

In other embodiments, the second input data may be generated during the process of displaying the real-time image corresponding to the external light in real time (i.e., displaying the continuously updated preview image) before the image is stored. In this case, the second input data is suitable for editing the preview image. According to an embodiment of the present disclosure, when generating the second input data, the processing device 540 may trigger the display device to display the updated real-time preview image according to the second input data.

For example, when the second input device is used to detect the user's operation, the second input data may be the data generated by detecting the user's operation on the second input device. Therefore, when user operation is not detected, regardless what the tilt of the display device 220 of the electronic device 100, the direction of the preview image displayed on the display area and the direction of the objects being captured in its surrounding may be consistent. For example, the butterfly in FIG. 3 is vertical, so whether the display device 220 in FIG. 3 is tilted or not, the direction of preview image of the butterfly shown in FIG. 3 is always vertical (e.g., the tilted display device 220 displays a portion of the butterfly that is vertical as the preview image). Next, assuming the display device 220 in FIG. 3 is tilted, user's operation is detected, and the second input data is generated, the processing device 540 may trigger the display device 220 to display the updated partial image in response to the second input data. For example, rotate and display an image (such as a butterfly) in the tilted display device 220 as shown in FIG. 6B, or reduce and display an image (such as a butterfly) in the tilted display device 220 as shown in FIG. 6A, so the full image of the butterfly may be viewed.

Alternatively, if the second input device is an input device that detects a change in the spatial parameters, if the display device 220 in FIG. 3 is tilted, at this time, the input device for detecting the change of the spatial parameters may detect the tilt of the electronic device and generate the second input data, the processing device 540 may trigger the display device 220 to display the updated partial image in response to the second input data. For example, rotate and display an image (such as a butterfly) in the tilted display device 220 as shown in FIG. 6B (i.e., the orientation of the preview image is consistent with the image in the display area of the display device), or reduce and display an image (such as a butterfly) in the tilted display device 220 as shown in FIG. 6A. (i.e., the orientation of the preview image is consistent with the display device before it is tilted, but the image is reduced). Therefore, on one hand, the user can see the overall appearance of the objects to be captured in during the image capturing process, and on the other hand, the user can also determine whether the display device may be tilted (such as a subtle, slightly inclining angle) based on the preview image in the display device 220.

According to an embodiment of the present disclosure, since the image displayed by the display area may be a part of the original image, the translation and rotation of the image of the display area is essentially selecting different parts of the original image for display, thus enhances user control over the displayed image and improves user experience.

According to an embodiment of the present disclosure, when the second input device 560 is an input device that detects a change in the spatial parameters, the spatial parameters of the display device may be detected using such device.

Moreover, according to an embodiment of the present disclosure, before storing the original image, the display of the partial real-time image that corresponds to changes in external light in real-time may be based on whether the spatial parameters of the display device 220 satisfies a first condition.

More specifically, when the spatial parameters of the display device 220 satisfy the first condition, the direction of the real-time image displayed by the display device 220 may have a first relationship with respect to the direction of the display area, and the direction of the real-time image displayed by the display device may have a second relationship with respect to the direction of the objects in its surrounding. Further, the first and second relationships may be different.

Alternatively, when the spatial parameters of the display device 220 fail to satisfy the first condition, the direction of the real-time image displayed by the display device 220 may be consistent with the direction of the objects in its surrounding.

An exemplary embodiment in which the display device 220 displays a real-time image based on whether the spatial parameters of the display device 220 satisfies the first condition or not will be explained below in conjunction with the exemplary embodiments of FIG. 3 and FIG. 6.

FIG. 6A-FIG. 6C are schematic diagrams illustrating a display device displaying an image before and after storing the according to an embodiment of the present disclosure.

First, as illustrated in FIG. 3, an external object (for example, a butterfly) 300 is in a vertical state.

FIGS. 6A and 6B illustrate two real-time image display scenarios when the spatial parameters of the display device 220 satisfy the first condition. In FIGS. 6A and 6B, an example of the first condition may be that the tilting angle of the display device 220 from its vertical direction is greater than 0° and less than 45°, such as a first angle. In some embodiments, if the first angle of the display device 220 in the vertical direction is greater than or equal to 0° and less than 45°, then the image may be considered as a vertical image; if the first angle of the display device 220 in the vertical direction is greater than 45° and less than or equal to 90°, then the image may be considered as a horizontal image.

In the example of FIG. 6A, the direction of the real-time image displayed by the display device 220 may have a first angle with respect to the display area of the display device 220, i.e., the first relationship may be the first angle. At the same time, the direction of the real-time image displayed by the display device 220 may be the same as the direction of the butterfly in FIG. 3, i.e., the second relationship is parallel. In this case, the real-time image displayed may be reduced.

In the example of FIG. 6B, the direction of the real-time image displayed by the display device 220 may coincide with the direction of the display area of the display device 220, i.e., the first relationship is parallel. At the same time, the direction of the real-time image displayed by the display device 220 may have a first angle with the direction of the butterfly in FIG. 3, i.e., the second relationship may be the first angle.

According to an embodiment of the present disclosure, regardless of the position of the displayed real-time image in FIG. 6A and FIG. 6B, the stored image may be displayed as shown FIG. 6C, i.e., the direction of the stored image and direction of the display area of the display device 220 may be the same so the stored image can be clearly displayed and the display area can be fully utilized.

Figure 7:
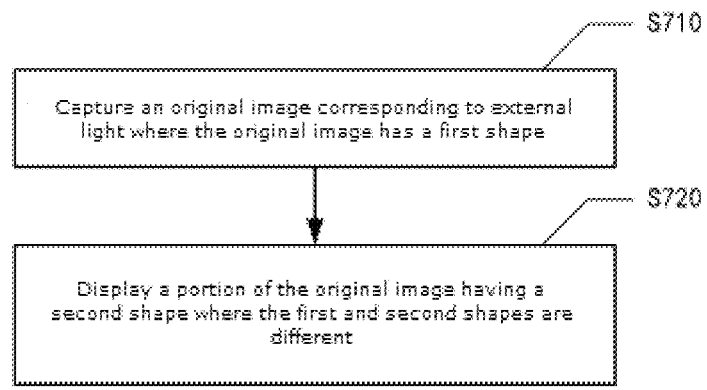
FIG. 7 is a flowchart illustrating a method for capturing an image according to an embodiment of the present disclosure.

FIG. 7 is a flowchart illustrating a method for capturing an image according to an embodiment of the present disclosure.

According to an embodiment of the present disclosure, the method of capturing an image includes steps S710 and S720.

During step S710, an original image corresponding to the external light is captured, and the original image has a first shape.

During step S720, a portion of the original image having a second shape is displayed where the first shape and the second shape are of different types.

According to an embodiment of the present disclosure, the shape of the light sensing surface of the light sensing module 212 that captures the original image may be different from the shape of the image display area, so that in some cases the displayed image in the display area may be a portion of the original image. In this way, a variety of editing needs for displaying images can be satisfied.

Figure 8:
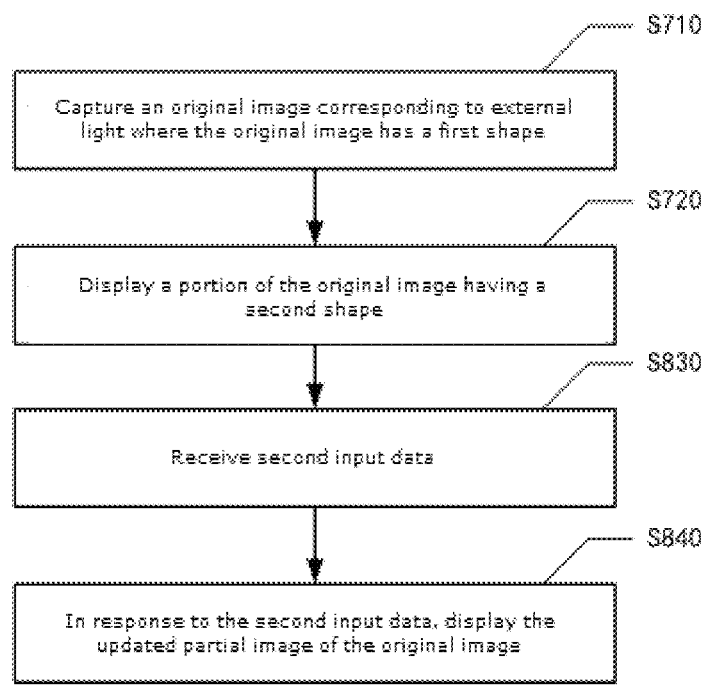
FIG. 8 is a flowchart illustrating a method for capturing an image according to another embodiment of the present disclosure.

FIG. 8 is a flowchart illustrating a method for capturing an image according to another embodiment of the present disclosure.

As shown in FIG. 8, according to another embodiment of the present disclosure, the method for capturing an image may further include steps S830 and S840 in addition to steps S710 and S720.

During step S830, the second input data is received.

During step S840, in response to the second data, the updated portion of the original image is displayed.

More specifically, the second input data may be, for example, data generated by the operation of correcting the displayed image (e.g., rotating a display image, or moving a display image in a display area, etc.).

When the second input data is generated, the updated portion of the original image may be displayed in response to the second input data.

According to an embodiment of the present disclosure, since the image displayed by the display area may be a part of the original image, the translation and rotation of the image of the display area is essentially selecting different parts of the original image for display, thus enhances user control over the displayed image and improves user experience.

Figure 9:
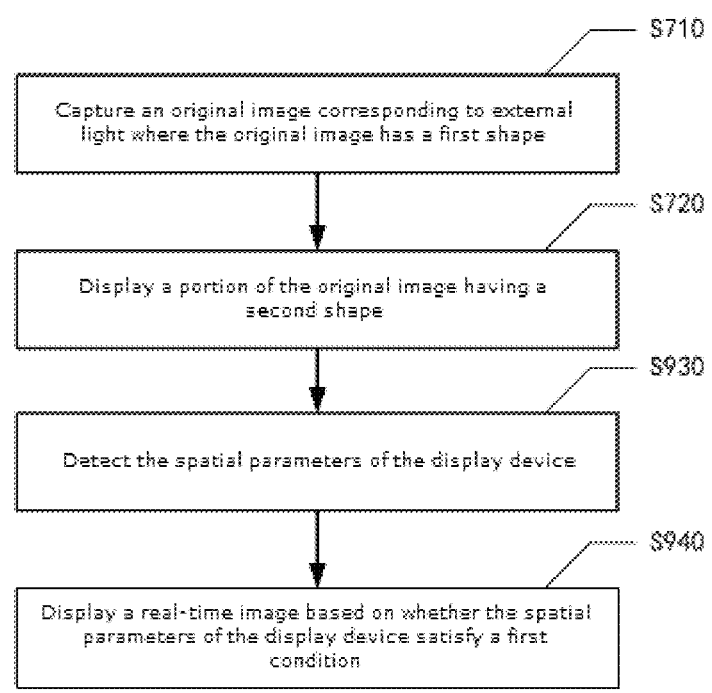
FIG. 9 is a flowchart illustrating a method for capturing an image according to another embodiment of the present disclosure.

FIG. 9 is a flowchart illustrating a method for capturing an image according to another embodiment of the present disclosure.

The method for capturing an image may further include steps S930 and S940 in addition to steps S710 and S720.

During step S930, the spatial parameters of the display device 220 are detected.

During step S940, the direction of the display of the partial real-time image that corresponds to changes in external light in real-time may be based on whether the spatial parameters of the display device 220 satisfies a first condition.

More specifically, during step S940 when the spatial parameters of the display device 220 satisfy the first condition, the direction of the partial real-time image displayed by the display device 220 may have a first relationship with respect to the direction of the display area, and the direction of the partial real-time image displayed by the display device may have a second relationship with respect to the direction of the objects in its surrounding, where the first and second relationships may be different.

Alternatively, when the spatial parameters of the display device 220 fail to satisfy the first condition, the direction of the partial real-time image displayed by the display device 220 may be consistent with the direction of the objects in its surrounding.

It will be understood by those skilled in the art that the features described in the respective embodiments and/or claims of the present disclosure may be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

What is claimed is:

1. An electronic device, comprising:
   a collecting device including a light sensing surface having a first shape to convert external light into an original image;
   a display device configured to display a portion of a real-time image obtained from the collecting device when a tilting angle of the display device does not satisfy a first condition, and proportionally reduce a size of the portion of the real-time image displayed on the display device to show a full content of the portion of the real-time image when the tilting angle of the display device satisfies the first condition,
   a first input device configured to generate a first input data of a user input; and
   a storage device configured to store the original image having the first shape in response to the first input data;
   wherein the display device having a display area is further configured to present a display image, the display image being a first portion of the original image in a second shape, wherein the first and second shapes are different shapes; and
   the electronic device further comprises a processing device configured to, in response to a user correction operation performed on the display image, display, through the display device, an updated partial image according to the user correction operation, the updated partial image being a second portion of the original image, and the user correction operation including at least one of translating the display image or rotating the display image relative to the display area of the electronic device.

2. The electronic device according to claim 1, wherein the processing device is further configured to:
   generate the updated partial image by moving an area in the original image corresponding to the display image in a plane, the area having the second shape.

3. The electronic device according to claim 1, wherein:
   a shape of the display area of the display device is a first rectangle, and
   the first shape of the light sensing surface covers a first area formed by translation or rotation of a second rectangle that corresponds with the first rectangle.

4. The electronic device according to claim 1, wherein:
   the user correction operation is detected by a user input device.

5. The electronic device according to claim 1, further comprising:
   wherein the second input device detects spatial parameters of the display device and inputs a change in the spatial parameters; in response to satisfying the first condition of the spatial parameters of the display device:
      the direction of the real-time image displayed by the display device has a first relationship with respect to the direction of the display area;
      the direction of the real-time image displayed by the display device has a second relationship with respect to the direction of physical objects in their surroundings in the real-time image; the first and second relationships being different; and wherein in response to not satisfying the first condition of the spatial parameters of the display device, the direction of the real-time image displayed by the display device is consistent with the direction of the physical objects in their surroundings.

6. The electronic device according to claim 1, wherein: the updated partial image does not include a black border.

7. The electronic device according to claim 1, wherein: a shape of the display area of the display device is a first rectangle, and
the first shape of the light sensing surface is a circle that circumscribes a second rectangle that corresponds to the first rectangle.

8. The electronic device according to claim 1, wherein the processing device is further configured to:
after the original image is stored, when the electronic device is titled at an angle, display the display image tilted at the same angle in response to a viewing request.

9. An electronic device, comprising:
a collecting device, comprising:
an optical device that receives external light;
a light sensing device that has a light sensing surface having a first shape to convert the external light into electrical signals to generate an original image;
a display device configured to display a portion of a real-time image obtained from the collecting device when a tilting angle of the display device does not satisfy a first condition, and proportionally reduce a size of the portion of the real-time image displayed on the display device to show a full content of the portion of the real-time image when the tilting angle of the display device satisfies the first condition,
a first input device configured to generate a first input data of a user input; and
a storage device configured to store the original image having the first shape in response to the first input data;
wherein the display device that has a display area having a second shape is further configured to display a display image, the display image being a first portion of the original image, wherein the first and second shapes are different shapes; and
the electronic device further comprises a processing device configured to, in response to a user correction operation performed on the display image, display, through the display device, an updated partial image according to the user correction operation, the updated partial image being a second portion of the original image, and the user correction operation including at least one of translating the display image or rotating the display image relative to the display area of the electronic device.

10. The electronic device according to claim 9, wherein the processing device is further configured to:
generate the updated partial image by moving an area in the original image corresponding to the display image in a plane, the area having the second shape.

11. The electronic device according to claim 9, wherein: the second shape of the display area of the display device is a first rectangle, and
the first shape of the light sensing surface covers a first area formed by translation or rotation of a second rectangle that corresponds to the first rectangle; or the first shape of the light sensing surface is a first circle that circumscribes a second rectangle that corresponds to the first rectangle.

12. The electronic device according to claim 9, wherein: the user correction operation is detected by a user input device.

13. The electronic device according to claim 9, further comprising:
Wherein the second input device detects the spatial parameters of the display device and inputs a change in spatial parameters; in response to satisfying the first condition of the spatial parameters of the display device:
the direction of the real-time image displayed by the display device has a first relationship with respect to the direction of the display area;
the direction of the real-time image displayed by the display device has a second relationship with respect to the direction of physical objects in their surroundings in the real-time image; the first and second relationships being different; and
wherein in response to not satisfying the first condition of the spatial parameters of the display device, the direction of the real-time image displayed by the display device is consistent with the direction of the physical objects in their surroundings.

14. A method for capturing an image using an electronic device, comprising:
capturing an original image, the original image having a first shape;
displaying a portion of a real-time image obtained from the collecting device when a tilting angle of the display device does not satisfy a first condition, and proportionally reducing a size of the portion of the real-time image displayed on the display device to show a full content of the portion of the real-time image when the tilting angle of the display device satisfies the first condition;
generating a first input data of a user input;
storing the original image in response to the first input data;
displaying a display image, the display image being a first portion of the original image and having a second shape, wherein the first and second shapes are different shapes; and
in response to a user correction operation performed on the display image, displaying an updated partial image according to the user correction operation, the updated partial image being a second portion of the original image, and the user correction operation including at least one of translating the display image or rotating the display image relative to the display area of the electronic device.

15. The method of claim 14, further comprising:
detecting the spatial parameters of the display device;
in response to satisfying the first condition of the spatial parameters of the display device, displaying a portion of the real-time image in a direction having a first relationship with respect to the direction of the display area; or
displaying the direction of the real-time image in a direction having a second relationship with respect to the direction of objects in the real-time image, the first and second relationships being different.

16. The method of claim 15, further comprising:
in response to not satisfying the first condition of the spatial parameters of the display device, displaying a portion of the real-time image in a direction that coincides with the direction of objects in the real-time image.

* * * * *